United States Patent
Yoon et al.

(10) Patent No.: US 11,837,876 B2
(45) Date of Patent: *Dec. 5, 2023

(54) ELECTRONIC DEVICE FOR PROVIDING WIRELESS CHARGING FUNCTION AND OPERATION METHOD THEREOF

(71) Applicant: Samsung Electronics Co., Ltd., Suwon-si (KR)

(72) Inventors: Duckwon Yoon, Suwon-si (KR); Minjun Kim, Suwon-si (KR); Jongheon Kim, Suwon-si (KR); Byungku Park, Suwon-si (KR); Minchul Sung, Suwon-si (KR); Dongjin Sohn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

This patent is subject to a terminal disclaimer.

(21) Appl. No.: 17/016,974

(22) Filed: Sep. 10, 2020

(65) Prior Publication Data

US 2021/0075264 A1 Mar. 11, 2021

(30) Foreign Application Priority Data

Sep. 10, 2019 (KR) .......................... 10-2019-0112170

(51) Int. Cl.
*G06F 3/044* (2006.01)
*H02J 50/12* (2016.01)
*H02J 7/02* (2016.01)

(52) U.S. Cl.
CPC ............ *H02J 50/12* (2016.02); *G06F 3/0446* (2019.05); *H02J 7/02* (2013.01); *G06F 3/0448* (2019.05)

(58) Field of Classification Search
CPC .... G06F 3/0446; G06F 3/0448; G06F 1/1616; G06F 1/1635; G06F 1/169;
(Continued)

(56) References Cited

U.S. PATENT DOCUMENTS

| 10,175,736 B2 | 1/2019 | Kim |
| 2009/0039828 A1 | 2/2009 | Jakubowski |

(Continued)

FOREIGN PATENT DOCUMENTS

| KR | 10-2011-0070274 A | 6/2011 |
| KR | 10-1968108 B1 | 4/2019 |

(Continued)

OTHER PUBLICATIONS

International Search Report dated Jan. 11, 2021, issued in International Application No. PCT/KR2020/012254.

(Continued)

*Primary Examiner* — Md Saiful A Siddiqui
(74) *Attorney, Agent, or Firm* — Jefferson IP Law, LLP

(57) ABSTRACT

An electronic device is provided. The electronic device includes a wireless charging function and a method thereof, and the electronic device that supports the wireless charging function may include a housing, a first sensor layer, disposed inside the housing and including a first electrode pattern and a plurality of first openings formed in the first electrode pattern, a second sensor layer, disposed below the first sensor layer and including a second electrode pattern and a plurality of second openings formed in the second electrode pattern, and a wireless charging coil, disposed below the second sensor layer and configured to transmit power via the plurality of first openings and the plurality of second openings in a wireless manner.

15 Claims, 12 Drawing Sheets

(58) Field of Classification Search
CPC ....... G06F 3/03547; G06F 2203/04105; G06F 3/0445; G06F 3/04164; H04M 2250/12; H02J 7/02; H02J 50/10; H02J 50/12; H02J 7/0042; H02J 50/005
See application file for complete search history.

(56) References Cited

U.S. PATENT DOCUMENTS

| | | | | |
|---|---|---|---|---|
| 2009/0134713 | A1* | 5/2009 | Stevens | H02J 50/60 307/104 |
| 2011/0169770 | A1* | 7/2011 | Mishina | G06F 3/0446 345/174 |
| 2013/0162202 | A1* | 6/2013 | Wang | H02J 50/10 320/108 |
| 2013/0278513 | A1* | 10/2013 | Jang | G06F 3/0445 345/173 |
| 2014/0255667 | A1 | 9/2014 | Kim et al. | |
| 2014/0267059 | A1 | 9/2014 | Deokar et al. | |
| 2016/0301237 | A1* | 10/2016 | Chen | H02J 50/10 |
| 2017/0185183 | A1 | 6/2017 | Sundararajan et al. | |
| 2018/0024665 | A1 | 1/2018 | Kent et al. | |
| 2018/0059843 | A1 | 3/2018 | Kim | |
| 2018/0124959 | A1* | 5/2018 | Saab | H04B 5/0075 |
| 2019/0190324 | A1* | 6/2019 | Bossetti | H02J 50/12 |
| 2020/0209995 | A1* | 7/2020 | So | H01Q 1/24 |
| 2020/0343314 | A1* | 10/2020 | Nakamura | H01Q 1/2208 |
| 2020/0411990 | A1* | 12/2020 | Nakamura | H01Q 7/00 |
| 2021/0099013 | A1* | 4/2021 | Tian | G06F 3/0446 |
| 2021/0143685 | A1* | 5/2021 | Kaiwa | H01F 27/366 |
| 2022/0011894 | A1* | 1/2022 | Zhu | G06F 3/0446 |

FOREIGN PATENT DOCUMENTS

| | | |
|---|---|---|
| WO | 2015/020683 A1 | 2/2015 |
| WO | WO 2021/000292 A1 * | 1/2021 |

OTHER PUBLICATIONS

Extended European Search Report dated Jul. 11, 2022, issued in European Patent Application No. 20863216.6-1224.

* cited by examiner

610

| | X9 | X10 | X11 | X12 | X13 | X14 | X15 | X16 | X17 | X18 | |
|---|---|---|---|---|---|---|---|---|---|---|---|
| $Y_0$ | 19863 | 19863 | 19863 | 19862 | 19863 | 19855 | 19858 | 19858 | 19857 | 19858 | |
| $Y_1$ | 19818 | 19824 | 19818 | 19818 | 19821 | 19812 | 19817 | 19818 | 19815 | 19819 | |
| $Y_2$ | 19824 | 19825 | 19829 | 19825 | 19821 | 19822 | 19823 | 19825 | 19823 | 19823 | |
| $Y_3$ | 19908 | 19911 | 19908 | 19907 | 19908 | 19908 | 19903 | 19903 | 19905 | 19907 | |
| $Y_4$ | 19873 | 19869 | 19870 | 19867 | 19869 | 19866 | 19864 | 19868 | 19864 | 19866 | |

622  620

| | X9 | X10 | X11 | X12 | X13 | X14 | X15 | X16 | X17 | X18 | |
|---|---|---|---|---|---|---|---|---|---|---|---|
| $Y_0$ | 20114 | 20066 | 19155 | 18867 | 18866 | 18839 | 18855 | 19463 | 20130 | 20201 | |
| $Y_1$ | 20183 | 20169 | 20089 | 19152 | 19818 | 18905 | 19467 | 20158 | 20212 | 20254 | |
| $Y_2$ | 20795 | 20810 | 20743 | 20326 | 19816 | 20031 | 20426 | 20769 | 20944 | 20885 | |
| $Y_3$ | 21246 | 21200 | 21238 | 21181 | 20739 | 21038 | 21331 | 21385 | 21360 | 21307 | |
| $Y_4$ | 21228 | 21139 | 21250 | 21171 | 20715 | 21041 | 21341 | 21359 | 21301 | 21351 | |

|     | X9    | X10   | X11   | X12   | X13   | X14   | X15   | X16   | X17   | X18   |
| --- | ----- | ----- | ----- | ----- | ----- | ----- | ----- | ----- | ----- | ----- |
| $Y_0$ | 18057 | 18057 | 18057 | 18056 | 18057 | 18050 | 18053 | 18053 | 18052 | 18053 |
| $Y_1$ | 18016 | 18022 | 18016 | 18016 | 18019 | 18011 | 18015 | 18016 | 18014 | 18017 |
| $Y_2$ | 18022 | 18023 | 18026 | 18023 | 18019 | 18020 | 18021 | 18023 | 18021 | 18021 |
| $Y_3$ | 18098 | 18101 | 18098 | 18097 | 18098 | 18098 | 18094 | 18094 | 18095 | 18097 |
| $Y_4$ | 18066 | 18063 | 18064 | 18061 | 18063 | 18060 | 18058 | 18062 | 18058 | 18060 |

642   640

|     | X9    | X10   | X11   | X12   | X13   | X14   | X15   | X16   | X17   | X18   |
| --- | ----- | ----- | ----- | ----- | ----- | ----- | ----- | ----- | ----- | ----- |
| $Y_0$ | 18094 | 18089 | 18090 | 18081 | 18087 | 18086 | 18093 | 18094 | 18088 | 18080 |
| $Y_1$ | 18042 | 18044 | 18044 | 18039 | 18040 | 18041 | 18046 | 18051 | 18042 | 18041 |
| $Y_2$ | 18051 | 18046 | 18051 | 18046 | 18043 | 18046 | 18050 | 18056 | 18052 | 18047 |
| $Y_3$ | 18123 | 18125 | 18125 | 18120 | 18122 | 18125 | 18121 | 18129 | 18124 | 18122 |
| $Y_4$ | 18086 | 18085 | 18088 | 18083 | 18085 | 18086 | 18083 | 18091 | 18087 | 18084 |

FIG.6B

ELECTRONIC DEVICE FOR PROVIDING WIRELESS CHARGING FUNCTION AND OPERATION METHOD THEREOF

CROSS-REFERENCE TO RELATED APPLICATION(S)

This application is based on and claims priority under 35 U.S.C. § 119(a) of a Korean patent application number 10-2019-0112170, filed on Sep. 10, 2019, in the Korean Intellectual Property Office, the disclosure of which is incorporated by reference herein in its entirety.

BACKGROUND

1. Field

The disclosure relates to an electronic device that provides a wireless charging function and an operation method thereof.

2. Description of Related Art

Electronic devices (e.g., a mobile terminal, a smart phone, a wearable device, and the like) are capable of providing various functions. For example, electronic devices may provide a short-range radio communication function, a mobile communication ($3^{rd}$-generation (3G), $4^{th}$-generation (4G) or $5^{th}$-generation (5G)) function, a music reproduction function, a video reproduction function, a photographing function, a navigation function, or a wireless charging function, in addition to a voice communication function, which is a basic function thereof.

An electronic device may be capable of charging a battery via a wireless charging function without using a separate charging cable. For example, the electronic device may be capable of charging a battery of the electronic device via electromagnetic induction or electromagnetic resonance that is produced between a wireless power transmission device (e.g., a wireless power transmission coil) and a wireless power reception device (e.g., a wireless power reception coil).

In addition, the electronic device may be capable of providing a battery-sharing function that shares charging power with another electronic device in a wireless manner via a wireless charging function.

The above information is presented as background information only to assist with an understanding of the disclosure. No determination has been made, and no assertion is made, as to whether any of the above might be applicable as prior art with regard to the disclosure.

SUMMARY

An electronic device that provides a battery-sharing function may include a wireless power transmission coil. The performance of the battery-sharing function may be related to the quality of the material of the electronic device (e.g., the quality of the material of the housing). For example, if metal is used for the housing of the electronic device, the transmission of charging power produced by a wireless power transmission coil may be disturbed. This may deteriorate the degree of satisfaction of a user who desires to use the battery-sharing function.

Aspects of the disclosure are to address at least the above-mentioned problems and/or disadvantages and to provide at least the advantages described below. Accordingly, an aspect of the disclosure is to provide an electronic device and an operation method thereof which improve wireless charging performance using the electronic device. The electronic device includes a touchpad including a sensor layer, which includes an electrode pattern and a plurality of openings formed in at least a part of the electrode pattern, and a ground layer, which is aligned with the electrode pattern and has at least one opening formed therein, and a wireless power transmission coil, disposed below the touchpad and configured to transmit charging power via the plurality of openings in a wireless manner.

The technical subject matter of the document is not limited to the above-mentioned technical matter, and other technical aspects that are not mentioned may be understood by those skilled in the art based on the following description.

Additional aspects will be set forth in part in the description which follows and, in part, will be apparent from the description, or may be learned by practice of the presented embodiments.

In accordance with an aspect of the disclosure, an electronic device that supports a wireless charging function is provided. The electronic device includes a housing, a first sensor layer, disposed inside the housing and including a first electrode pattern and a plurality of first openings formed in the first electrode pattern, a second sensor layer, disposed below the first sensor layer and including a second electrode pattern and a plurality of second openings formed in the second electrode pattern, and a wireless charging coil, disposed below the second sensor layer and configured to transmit power via the plurality of first openings and the plurality of second openings in a wireless manner.

In accordance with another aspect of the disclosure, an operation method of an electronic device is provided. The operation method includes a touchpad, including an electrode pattern and a plurality of openings formed in the electrode pattern, and a wireless charging coil, may include performing a touch detection function of detecting contact with an input object using at least one electrode pattern of the touchpad, and performing a charging function of transmitting power via the plurality of openings in a wireless manner using the wireless charging coil in response to reception of input performed on a designated first control key.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6A is a diagram illustrating a measurement value related to a capacitance of a normal touchpad according to an embodiment of the disclosure;

FIG. 6B is a diagram illustrating a measurement value related to a capacitance of a touchpad according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
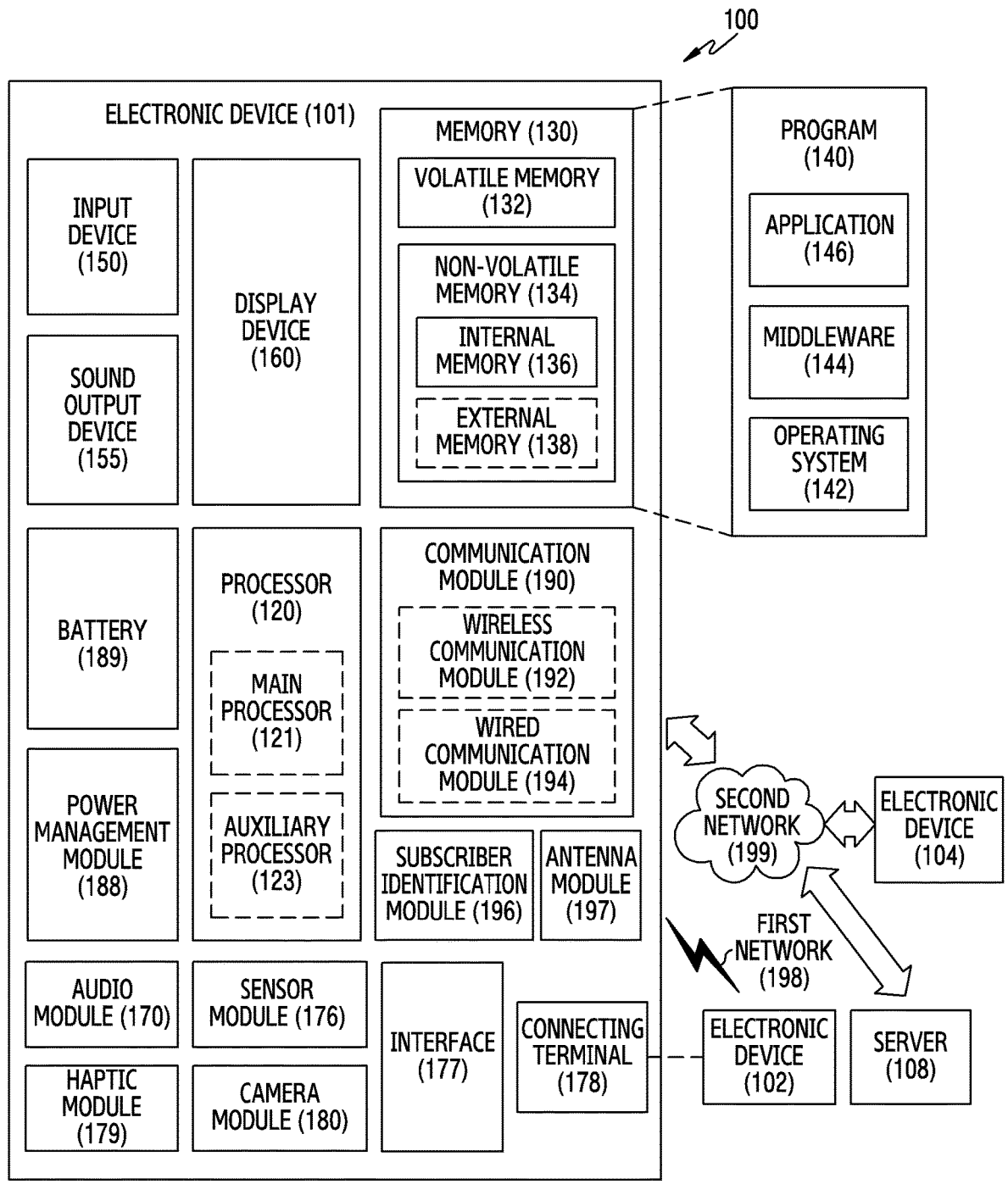
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
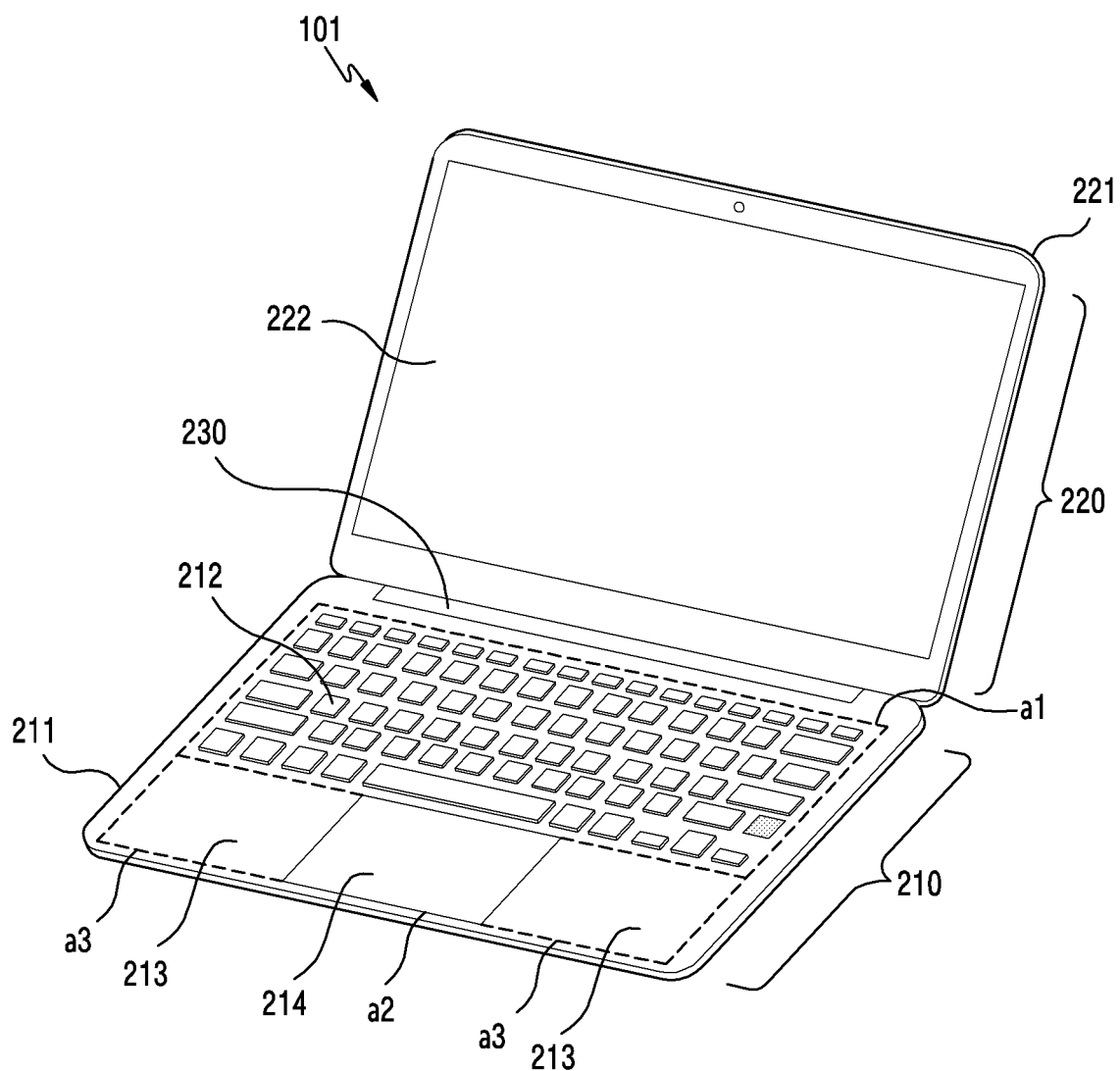
FIG. 2 is a perspective view of an electronic device equipped with a touchpad in an unfolded state according to an embodiment of the disclosure.

FIG. 2 is a perspective view of an electronic device equipped with a touchpad in an unfolded state according to an embodiment of the disclosure.

Referring to FIG. 2, the electronic device 101 according to various embodiments may include a first electronic device 210, a second electronic device 220, and a connection part 230 that connects the first electronic device 210 and the second electronic device 220. The connection part 230 may mechanically or electrically connect the first electronic device 210 and the second electronic device 220. In the case in which the first electronic device 210 and the second electronic device 220 are mechanically connected, if a rotation axis is provided, a hinge may be employed. If they are folded in or out, a folding part may be provided. In addition, at least one of the first electronic device 210 or the second electronic device 220 may have a structure that is detached from and/or attached to the connection part 230. If the first electronic device 210 and the second electronic device 220 are electrically connected, a flexible printed circuit board (FPCB) may be employed.

The first electronic device 210 according to various embodiments may include a first housing 211 that protects various electronic components and is associated with the appearance thereof. The first housing 211 according to various embodiments may include a first side that faces a first direction and a second side that faces a second direction, which is the opposite of the first direction. The first side may be an internal side of the electronic device 101 and the second side may be an external side of the electronic device 101. In addition, the first side may be the top side (or front side) of the first electronic device 210, and the second side may be the rear side of the first electronic device 210.

In the first housing 211 according to various embodiments of the disclosure, a plurality of keys 212, a touchpad 214, and a palm rest 213 may be disposed. Since the plurality of keys 212 may be disposed on the first side of the first housing 211, they may be referred to as a data input device, a keyboard, or a keyboard housing. The plurality of keys 212 may be arranged according to a QWERTY key arrangement. The area in which the plurality of keys 212 is disposed in the first housing 211 may be referred to as a keyboard area.

The first side of the first housing 211 may include a first area a1 in which the plurality of keys 212 is disposed, a second area a2 in which the touchpad 214 is disposed, and a third area a3 in which the palm rest 213 is disposed. The first area a1, the second area a2, and the third area a3 are not superposed, and may be disposed so as to be aligned with and parallel to each other. The third area a3 may be disposed on both sides of the second area a2. For example, the third area a3 may be made of metal. However, this is merely an example, and the embodiments of the disclosure are not limited thereto. For example, the third area a3 may be made of a material other than metal, or may be made of a combination of metal and another material.

According to various embodiments of the disclosure, the touchpad 241 may be a printed circuit board or a flexible printed circuit board.

According to various embodiments of the disclosure, the position of the touchpad 214 may correspond to the position where a wireless charging device (e.g., a wireless power transmission coil) is disposed, as described below with reference to FIG. 3. For example, the touchpad 214 may be disposed above the wireless charging device. In addition, the touchpad 214 may have at least one opening formed therein so as to provide a path through which the charging power produced by the wireless charging device is transmitted, as described below with reference to FIGS. 4A, 4B, 5A, 5B and 5C.

The second electronic device 220 according to various embodiments may include a second housing 221 that protects various electronic components and is associated with the appearance thereof. The second housing 221 according to various embodiments may include a first side that faces a first direction and a second side that faces a second direction, which is the opposite of the first direction. The first side may be an internal side of the electronic device 101, and the second side may be an external side of the electronic device 101. In addition, the first side may be the top side (or front side) of the second electronic device 220, and the second side may be the rear side of the second electronic device 220.

A display 222 may be disposed on the first side of the second housing 221. The display 222 may be equipped with a touch-detection panel, and may operate as a touch screen. The second electronic device 220 may be equipped with the display 222, and may be referred to as a display device.

The structure of the above-described electronic device 101 is merely an example, and the embodiments of the disclosure are not limited thereto. For example, at least one of the above-described components of the electronic device 101 may be omitted, or another component may be further added. For example, a vent, through which air that flows in from the outside passes through the inside of the electronic device 101 and is emitted to the outside, is formed in a lateral side of the electronic device 101 in order to cool off the heat produced inside the electronic device 101.

Hereinafter, the structure of the touchpad 214 attached to the second area a2 of the first electronic device 210 will be described with reference to the accompanying drawings.

Figure 3:
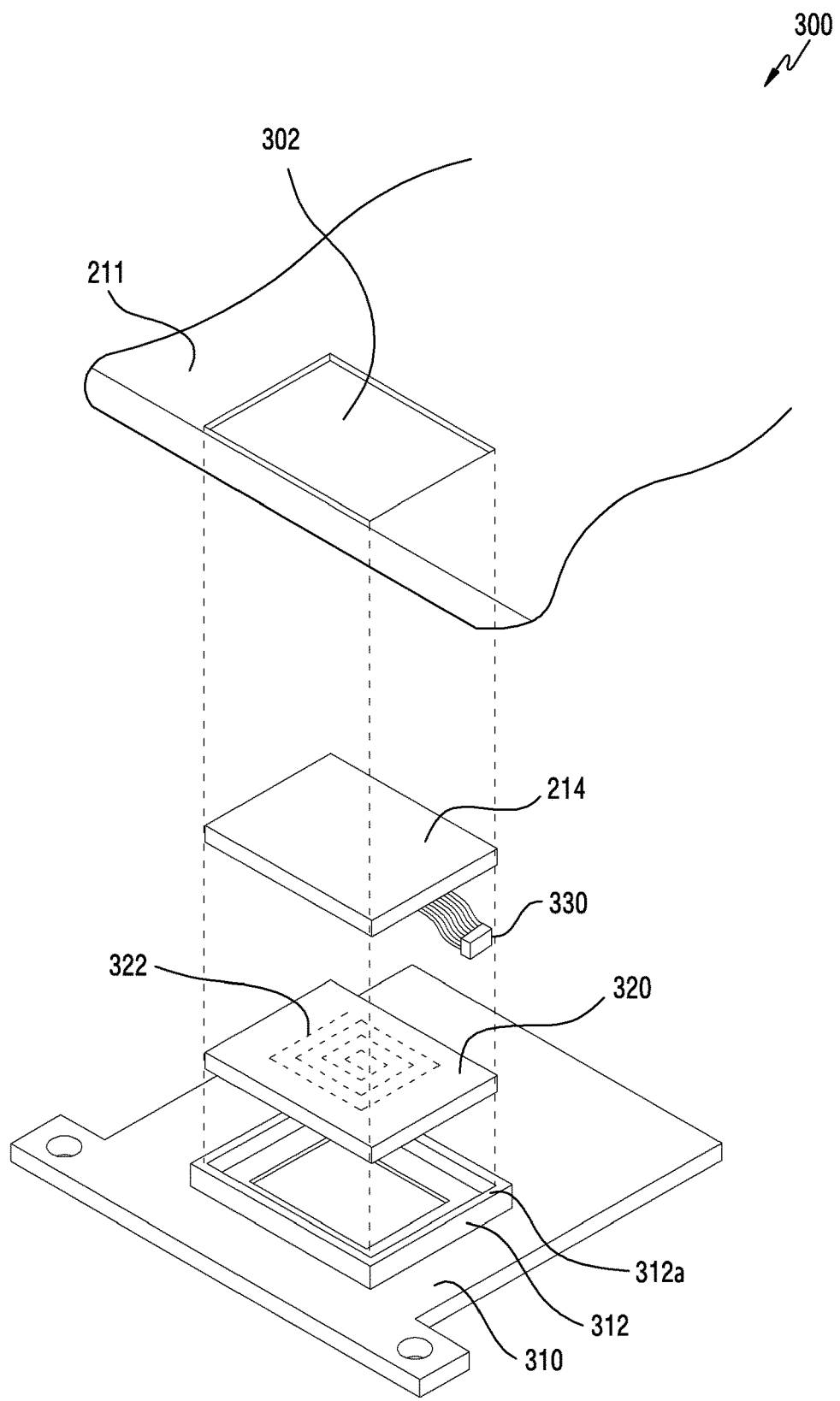
FIG. 3 is an exploded perspective view of a touchpad device according to an embodiment of the disclosure.

FIG. 3 is an exploded perspective view 300 of a touchpad device according to an embodiment of the disclosure.

Referring to FIG. 3, the touchpad device may further include a touchpad 214 capable of being touched by a user's hand and a supporting member 310 that supports or fixes the touchpad 214.

According to various embodiments of the disclosure, the touchpad 214 may detect a predetermined signal when an input object (e.g., at least a part of a body, an electronic pen, or the like) is brought into contact with the touchpad 214. Accordingly, processing is performed to input a location to which a user desires to point. For example, the touchpad 214 may process information associated with coordinates (e.g., an X-axis coordinate and/or Y-axis coordinate) of a point that is touched. In addition, a connection member 330 (e.g., a cable and a connector) configured to detect an external signal and transfer the detected signal to the electronic device 101 (e.g., the processor 120) may be mounted at one end of the touchpad 214.

According to various embodiments of the disclosure, a wireless charging device 320 configured to transmit wireless charging power may be disposed below the touchpad 214. According to an embodiment of the disclosure, the wireless charging device 320 may include a charging coil (e.g., a power reception and/or power transmission coil) 322 for wireless charging. For example, the wireless charging device 320 may provide power that another electronic device requests using the charging coil 322 in a wireless manner. For example, the wireless charging device 320 may be layered below the touchpad 214.

According to various embodiments of the disclosure, the wireless charging device 320 may be a printed circuit board or a flexible printed circuit board on which the pattern of the charging coil 322 is disposed.

According to various embodiments of the disclosure, the supporting member 310 may include a pad housing 312 that allows the touchpad 214 and the wireless charging device 320 to be installed therein. For example, a seat 312a may be disposed in the pad housing 312 so that the touchpad and the wireless charging device 320 may be seated thereon. For example, the size of the seat 312a may correspond to the sizes of the touchpad 214 and the wireless charging device 320.

At least a part (e.g., the touchpad 214) of the above-described touchpad device may have a structure that is exposed via an opening 302 formed in at least a part of the first housing 211 of the electronic device 101. The opening 302 may be formed in at least a part of the first housing 211, the position of which corresponds to the positions of the touchpad 214 and the wireless charging device 320, and may have a size corresponding to the sizes of the touchpad 214 and the wireless charging device 320.

In addition, the touchpad device may include additional components, in addition to the above-described components. According to an embodiment of the disclosure, a cover member for protecting the touchpad 214 may be further disposed above the touchpad 214. For example, the cover member may include a glass plate, a fiberglass-reinforced plastic (FRP) plate, a polyvinyl fluoride film, a mylar film, a polyester film, or an acrylic film. However, these are merely examples, and the embodiments of the disclosure are not limited thereto. For example, various types of materials which do not disturb the transmission of wireless charging power may be used for configuring the cover member. According to various embodiments of the disclosure, an insulation layer is further disposed between the touchpad 214 and the wireless charging device 320, and the touchpad 214 and the wireless charging device 320 may be electrically insulated by the insulation layer.

In addition, as described above, the touchpad 214 and the wireless charging device 320 may be separate structures. However, this is merely an example, and the embodiments of the disclosure are not limited thereto. For example, the wireless charging device 320 and the touchpad 214 may be provided in an integral structure.

Figure 4A:
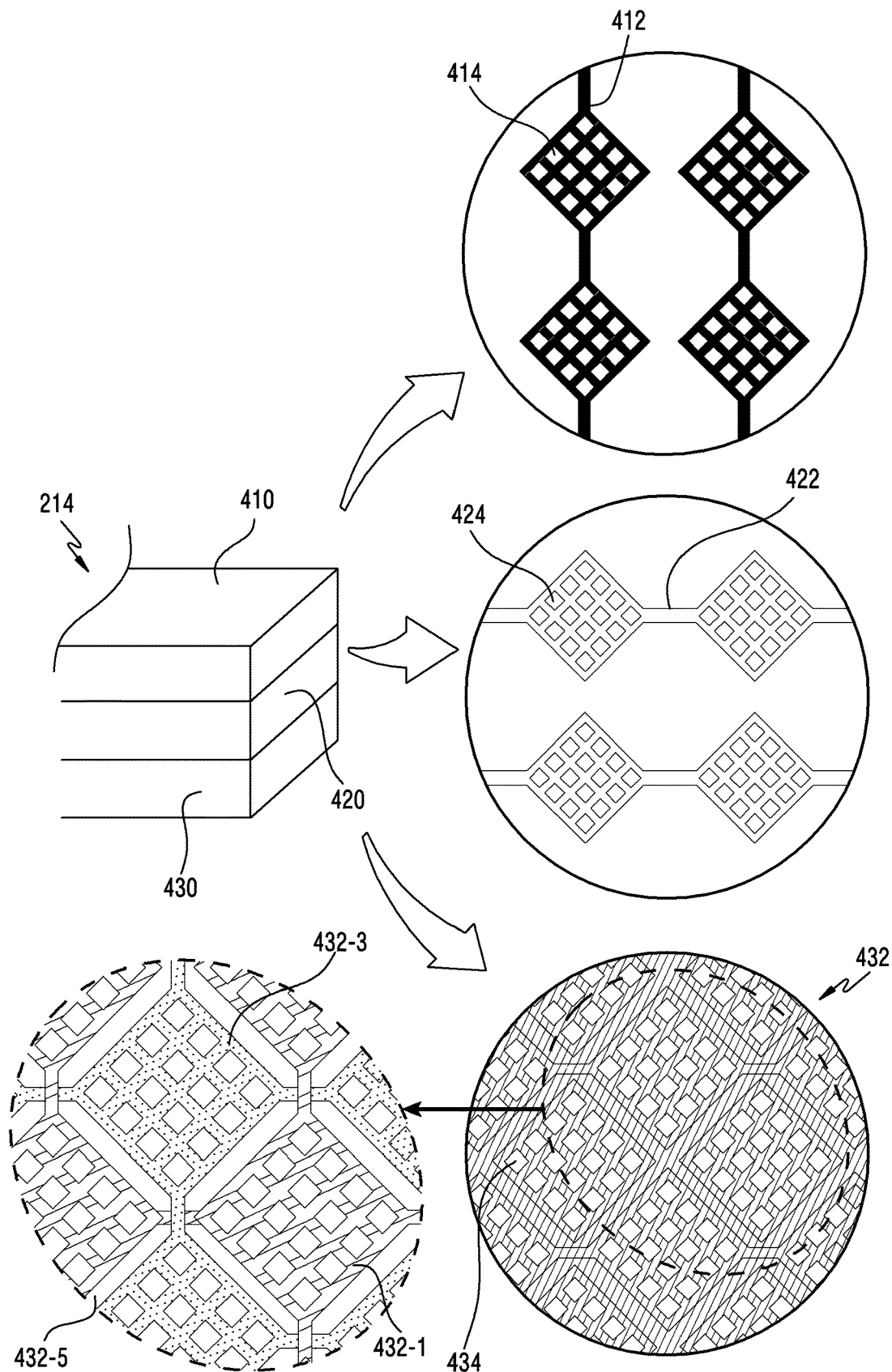
FIG. 4A is a diagram illustrating a configuration of a touchpad according to an embodiment of the disclosure.
Figure 4B:
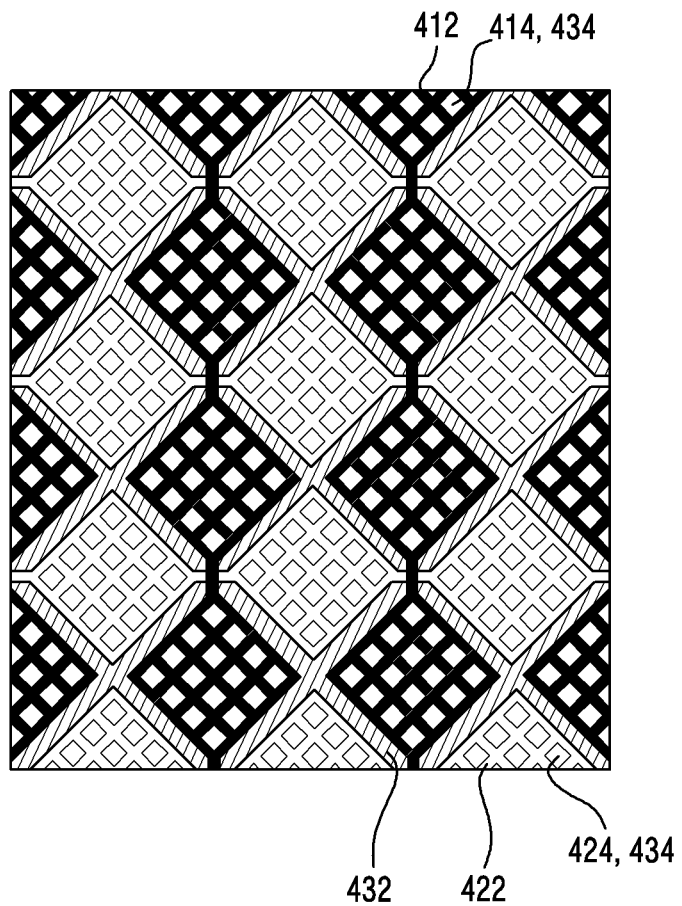
FIG. 4B is a diagram illustrating a state in which a first sensor layer, a second sensor layer, and a ground layer of a touch panel are stacked according to an embodiment of the disclosure.

FIG. 4A is a diagram illustrating a configuration of a touchpad 214 according to an embodiment of the disclosure. FIG. 4B is a diagram illustrating a state in which a first sensor layer, a second sensor layer, and a ground layer of a touch panel are stacked according to an embodiment of the disclosure.

Referring to FIG. 4A, the touchpad 214 may include a first sensor layer 410 in which a first electrode pattern is disposed, a second sensor layer 420 in which a second electrode pattern is disposed, and a ground layer 430.

Figure 5A:
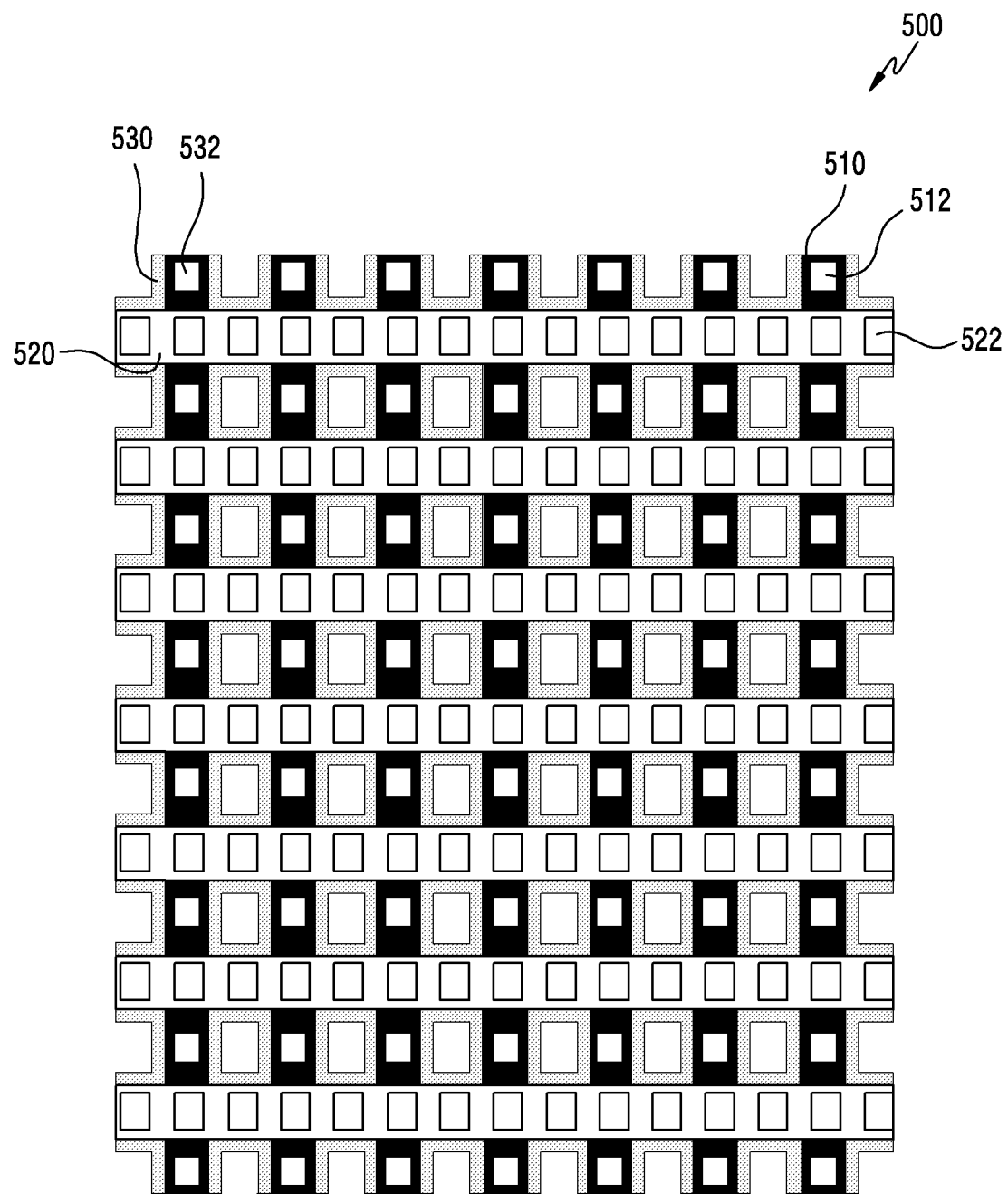
FIG. 5A is a diagram illustrating openings formed in a touchpad having a bar-shaped electrode pattern according to an embodiment of the disclosure.
Figure 5B:
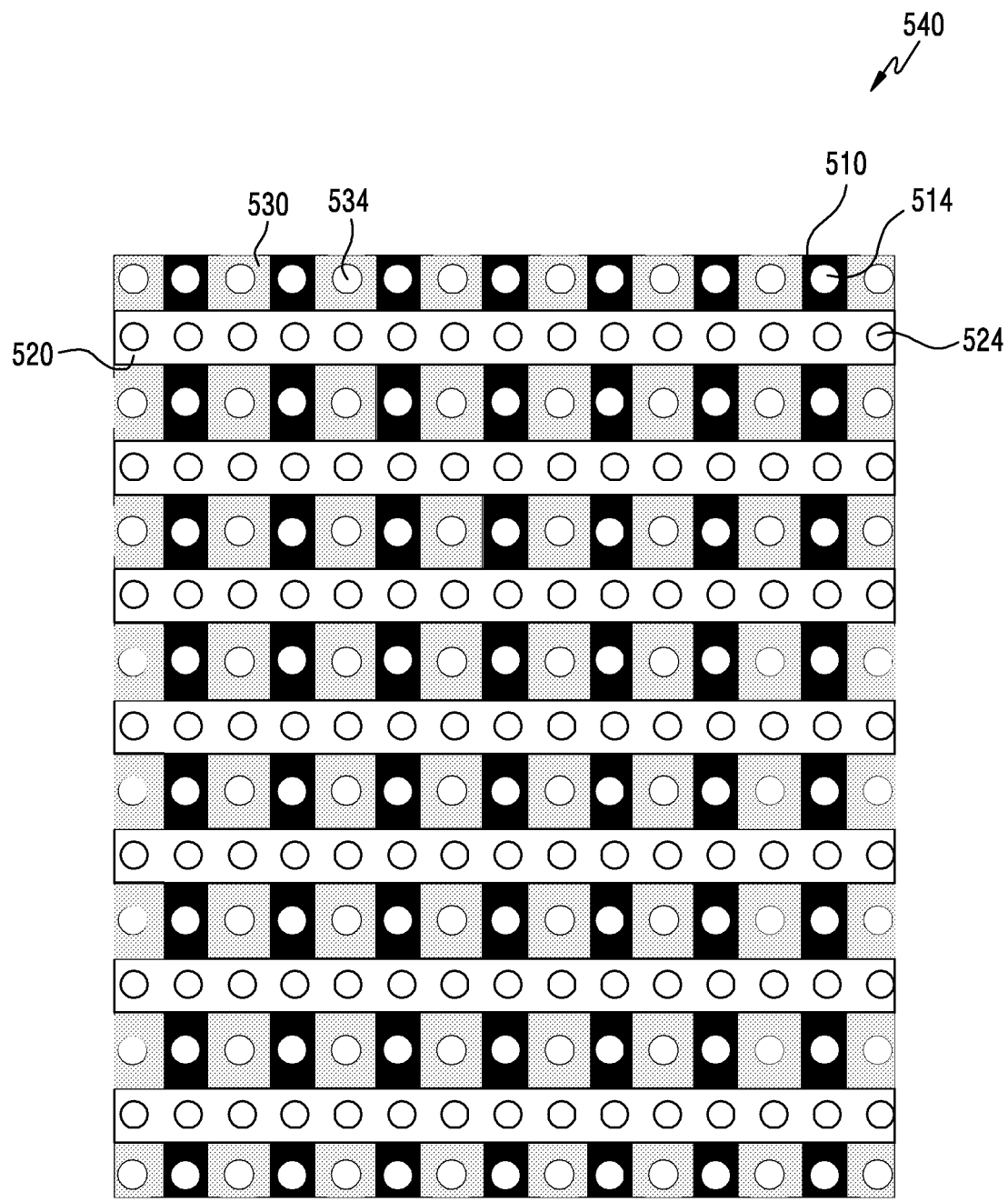
FIG. 5B is a diagram illustrating openings formed in a touchpad having a bar-shaped electrode pattern according to an embodiment of the disclosure.
Figure 5C:
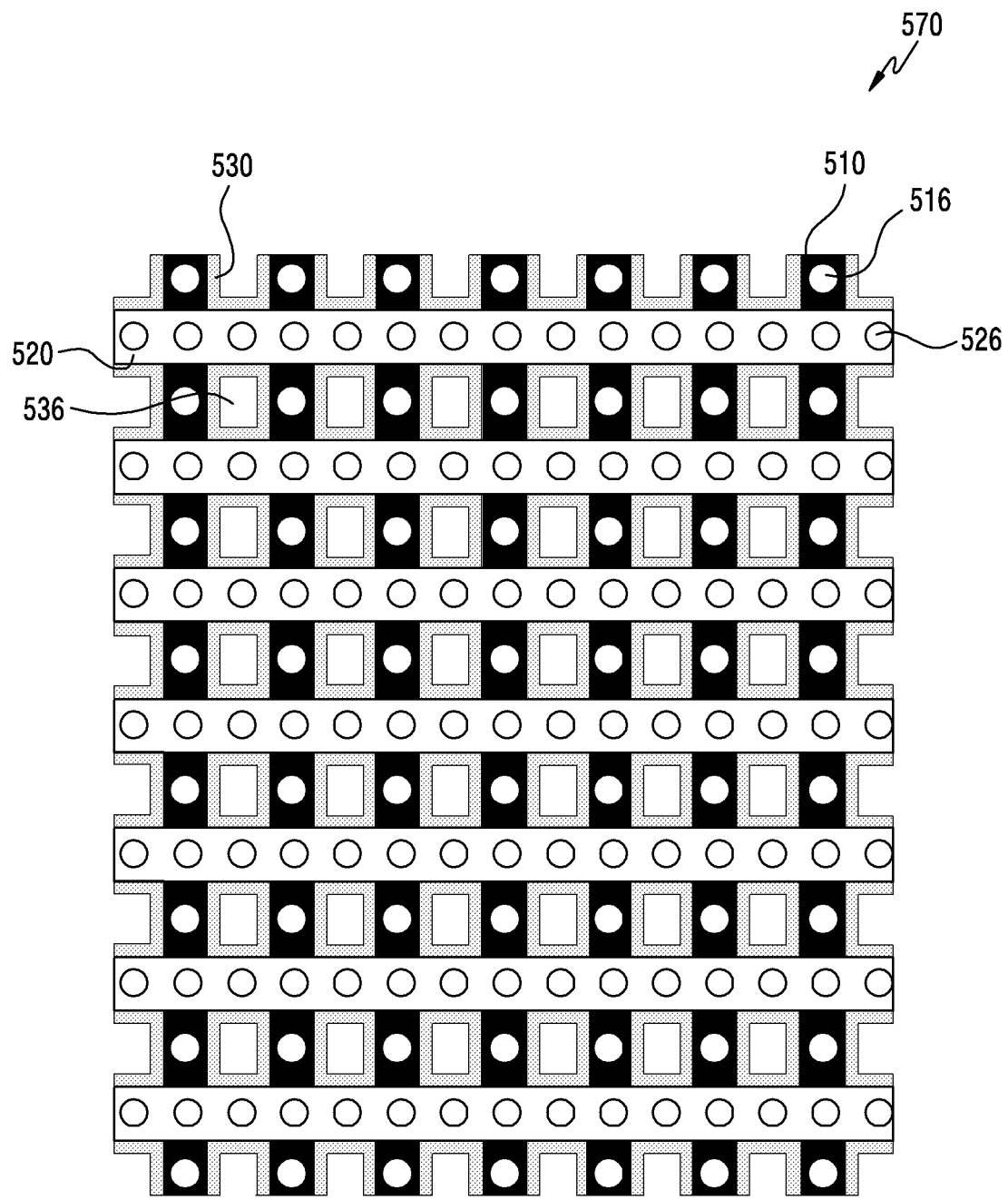
FIG. 5C is a diagram illustrating openings formed in a touchpad having a bar-shaped electrode pattern according to an embodiment of the disclosure.

According to various embodiments of the disclosure, the first sensor layer 410 may include a plurality of first electrode patterns 412 disposed in a first direction (e.g., the X-axis direction). In addition, the first electrode patterns 412 may be electrically connected to each other so that a touch may be detected at a point that is touched. According to an embodiment of the disclosure, the first electrode pattern 412, which is provided in a rhombus shape, may be regularly disposed. However, this is merely an example, and the embodiments of the disclosure are not limited thereto. For example, the first electrode pattern may be disposed in a bar shape, as illustrated in FIGS. 5A, 5B and 5C, and may also be disposed in one of various other shapes.

According to various embodiments of the disclosure, the second sensor layer 420 may include a plurality of second electrode patterns 422 arranged in a second direction (e.g., the Y-axis direction), which is different from the first direction. In addition, the second electrode patterns 422 may be electrically connected to each other so that a touch may be detected at a point that is touched. According to an embodiment of the disclosure, the second electrode pattern 422 may have the same shape as the first electrode pattern 412. However, this is merely an example, and the embodiments of the disclosure are not limited thereto. For example, the shape of the first electrode pattern 412 may be different from the shape of the second electrode pattern 422.

According to various embodiments of the disclosure, the first electrode pattern 412 may have at least one opening 414 formed therein, and the second electrode pattern 422 may have at least one opening 424 formed therein. According to an embodiment of the disclosure, the opening 414 and the opening 424 formed in the first electrode pattern 412 and the second electrode pattern 422 may form a path along which charging power produced by the wireless charging device 320 is transmitted. For example, the opening 414 formed in the first electrode pattern 412 and the opening 424 formed in the second electrode pattern 422 may be provided in a rhombus shape, and the openings may be arranged in a 4×4 array, as illustrated in FIG. 4A. However, this is merely an example, and the embodiments of the disclosure are not limited thereto. The openings 414 and the openings 424 formed in the first electrode pattern 412 and the second electrode pattern 422 may be arranged in one of various arrangements, and the shape of an opening, the size of an opening, and the number of openings are not limited.

According to various embodiments of the disclosure, at least one ground pattern 432 may be disposed in the ground layer 430. The ground pattern 432 may include a plurality of first ground patterns 432-1 disposed in a first direction (e.g., the X-axis direction) and a plurality of second ground patterns 432-3 disposed in a second direction (e.g., the Y-axis direction), which is different from the first direction. However, this is merely an example, and the embodiments of the disclosure are not limited thereto.

According to an embodiment of the disclosure, the charging power produced by the wireless charging device 320 may be transmitted using a space 432-5 configured between the ground patterns (e.g., the ground patterns 432-1 and 432-3).

According to an embodiment of the disclosure, the ground pattern 432 may be aligned with at least one of the first electrode pattern 412 or the second electrode pattern 422. For example, the first ground pattern 432-1 may be aligned with the first electrode pattern 412, and the second ground pattern 432-3 may be aligned with the second electrode pattern 422.

According to various embodiments of the disclosure, the first ground pattern 432-1 and the second ground pattern 432-3 may be electrically connected to form a single ground pattern.

According to an embodiment of the disclosure, the ground pattern 432 may have the same shape as the first electrode pattern 412 and the second electrode pattern 422. In addition, the location of the ground pattern 432 may correspond to the location of the first electrode pattern 412 and the location of the second electrode pattern 422. However, this is merely an example, and the embodiments of the disclosure are not limited thereto. For example, at least a part of the ground pattern 432 may not correspond to the shape of the electrode pattern (e.g., the first electrode pattern 412 and the second electrode pattern 422) and the location of the electrode pattern (e.g., the first electrode pattern 412 and the second electrode pattern 422).

According to various embodiments of the disclosure, at least one opening 434 may be formed in the ground layer 430 (e.g., the ground pattern 432). According to an embodiment of the disclosure, the location of the opening 434 formed in the ground layer 430 may correspond to the location of the opening 414 formed in the first electrode pattern 412 and the location of the opening 424 formed in the second electrode pattern 422.

According to various embodiments of the disclosure, the touchpad 214 may be implemented as the first sensor layer 410, the second sensor layer 420, and the ground layer 430 are stacked. As illustrated in FIG. 4B, via the first sensor layer 410 and the second sensor layer 420, the first electrode pattern 412 and the second electrode pattern 422 may be evenly disposed on the front side of the touchpad 214. Additionally, the openings 414, 424, and 434, formed in the first sensor layer 410, the second sensor layer 420, and the ground layer 420, may also be evenly disposed on the front side of the touchpad 214. Via the openings 414, 424, and 434, charging power may pass through the touchpad 214 without being blocked by the first sensor layer 410, the second sensor layer 420, or the ground layer 430. Accordingly, the wireless charging efficiency of the wireless charging device 320 (or the electronic device 101) may be improved. In addition, as described above, the ground layer 430 may be aligned with at least one of the first electrode pattern or the second electrode pattern, so that the capacitance of the touchpad 214 may be prevented from being changed by the wireless charging device 320, as described below with reference to FIGS. 6A and 6B.

Although it is illustrated that the first electrode pattern 412, the second electrode pattern 422, and the ground pattern 432 of the touchpad 214 are formed in different layers, this is merely an example, and the disclosure is not limited thereto. For example, at least two of the first electrode pattern 412, the second electrode pattern 422, or the ground pattern 432 may be disposed in the same layer. In addition, although it is illustrated that at least one opening 414, 424, and 434 is formed in each of the first electrode pattern 412, the second electrode pattern 422, and the ground pattern 432 of the touchpad 214, at least one opening may be formed in at least one of the first electrode pattern 412, the second electrode pattern 422, or the ground pattern 432.

FIG. 5A is a diagram 500 illustrating openings formed in a touchpad having a bar-shaped electrode pattern according to an embodiment of the disclosure. FIG. 5B is a diagram 540 illustrating openings formed in a touchpad having a bar-shaped electrode pattern according to an embodiment of the disclosure. FIG. 5C is a diagram 570 illustrating openings formed in a touchpad having a bar-shaped electrode pattern according to an embodiment of the disclosure.

Referring to FIG. 5A, unlike the touchpad 214 described with reference to FIGS. 4A and 4B, a touchpad 570 may be implemented as a first sensor layer 510, in which a first electrode pattern having a bar shape is arranged in a first direction (e.g., the X-axis direction), a second sensor layer 520, in which a second electrode pattern, having a bar shape is arranged in a second direction (e.g., the Y-axis direction), and a ground layer 530 are stacked. According to various embodiments of the disclosure, the first sensor layer 510 (or the first electrode pattern) may include at least one opening 512, and the second sensor layer 520 (or the second electrode pattern) may include at least one opening 522. In addition, at least one opening 532 may be formed in the ground layer 530. According to an embodiment of the disclosure, the location of the opening 532 formed in the ground layer 530 may correspond to the location of the opening 512 formed in the first sensor layer 510 and the location of the opening 522 formed in the second sensor layer 520. For example, at least one opening 512, 522, and 532 formed in the first sensor layer 510, the second sensor layer 520, or the ground layer 530 may be provided in a quadrangular shape, as shown in the drawing. However, this is merely an example, and the embodiments of the disclosure are not limited thereto.

Referring to FIG. 5B, the touchpad may include circular openings 514, 524, and 534 formed in the first sensor layer 510, the second sensor layer 520, and the ground layer 530. In addition, an opening may be formed in one of various shapes, such as a hexagonal shape, a triangular shape, and the like. As another example, an opening formed in at least one of the first sensor layer 510, the second sensor layer 520, and the ground layer 530 may have a shape different from that of an opening formed in another layer. For example, the respective openings in the first sensor layer 510 and the second sensor layer 520 may be different from each other. As another example, a plurality of openings having different shapes may be formed in at least one of the first sensor layer 510, the second sensor layer 520, and the ground layer 530.

Referring to FIG. 5C, in the ground layer 530 of the touchpad, a first type opening 516 and 526 (e.g., a circular opening), corresponding to the shape of an opening in the first sensor layer 510 and the second sensor layer 520, and a second type opening 536 (e.g., a quadrangular opening), having a shape different from that of the first type opening, may be included.

FIG. 6A is a diagram illustrating measurement values 610 and 620 related to a capacitance of a normal touchpad according to an embodiment of the disclosure. FIG. 6B is a diagram illustrating measurement values 630 and 640 related to a capacitance of a touchpad according to an embodiment of the disclosure.

Referring to FIG. 6A, table 610 lists values obtained by performing digital conversion on initial capacitance of a normal touchpad, wherein the capacitance value measured at each set of coordinates may be similar to each other. More particularly, the standard deviation of the initial capacitance values at respective coordinates may be approximately 33.28141358.

In addition, table 620 lists values obtained by performing digital conversion on the initial capacitance of a touchpad in the state in which the wireless charging device 320 is disposed below the touchpad, in which a ground layer is not formed. Table 620 shows that a change in capacitance occurs at some coordinates 622 of the touchpad, when compared to table 610. More particularly, the standard deviation associated with the initial capacitance at respective coordinates may be increased to approximately 642.4766106. The charging power produced by a conductive charging coil disposed below the touchpad is blocked by the touchpad, and thus the capacitance at some coordinates of the touchpad may be changed.

Referring to FIG. 6B, table 630 lists values obtained by performing digital conversion on the initial capacitance of a touchpad, in which at least one opening and a ground layer are disposed, and the capacitance value measured at each set of coordinates may be similar to those listed in table 610. More particularly, the standard deviation of the initial capacitance values at respective coordinates may be approximately 30.25583053, which may be slightly lower than the values in table 610, obtained by performing digital conversion on the capacitance of the normal touchpad. Generally, a touchpad having low capacitance may show high detection performance. The detection performance of the touchpad may be improved owing to the inclusion of the openings and a ground layer of the touchpad.

In addition, table 640 lists values obtained by performing digital conversion on the initial capacitance of a touchpad in the case in which a wireless charging device is disposed below the touchpad, and the change in capacitance may be insignificant when compared to table 630. More particularly, the standard deviation of the initial capacitance values at coordinates 642, which are coordinates at which the capacitance changes as shown in the diagram 622 of FIG. 6A, may be approximately 33.36133702. The charging power produced by a conductive charging coil disposed below the touchpad is not blocked by the touchpad, and thus the capacitance at some coordinates of the touchpad may not be changed.

An electronic device (e.g., the electronic device 101) that supports a wireless charging function according to various embodiments may include a housing (e.g., the first housing 211), a first sensor layer (e.g., the first sensor layer 410), disposed inside the housing and including a first electrode pattern (e.g., the first electrode pattern 412) and a plurality of first openings (e.g., the opening 414) disposed in the first electrode pattern, a second sensor layer (e.g., the second sensor layer 420), disposed below the first sensor layer and including a second electrode pattern (e.g., the second electrode pattern 422) and including a plurality of second openings (e.g., the opening 424) formed in the second electrode pattern, and a wireless charging coil (e.g., the wireless charging coil 322), disposed below the second sensor layer and configured to transmit power via the plurality of first openings and the plurality of second openings in a wireless manner.

According to various embodiments of the disclosure, the electronic device that supports the wireless charging function may further include a ground layer (e.g., the ground layer 430), disposed below the second sensor layer and configured to be aligned with at least one of the first electrode pattern or the second electrode pattern.

According to various embodiments of the disclosure, the ground layer may be disposed between the second sensor layer and the wireless charging coil.

According to various embodiments of the disclosure, the ground layer may include at least one third opening (e.g., the opening 434), and the wireless charging coil may be configured to transmit power via the plurality of first openings, the plurality of second openings, and the at least one third opening in a wireless manner.

According to various embodiments of the disclosure, the at least one third opening may correspond to at least one of locations of the plurality of first openings or locations of the plurality of second openings.

According to various embodiments of the disclosure, the at least one third opening may correspond to at least one of shapes of the plurality of first openings or shapes of the plurality of second openings.

According to various embodiments of the disclosure, the at least one third opening may correspond to at least one of a number of the plurality of first openings and a number of the plurality of second openings.

According to various embodiments of the disclosure, the first sensor layer and the second sensor layer may be configured to detect contact with an input object.

According to various embodiments of the disclosure, the electronic device that supports the wireless charging function may further include at least one control key (e.g., the key 212) configured to control the wireless charging function, and a processor (e.g., the processor 120) configured to activate the wireless charging coil, in response to reception of input performed on a control key that activates the wireless charging function.

According to various embodiments of the disclosure, when the wireless charging coil is activated, the processor may be configured to deactivate the first sensor layer and the second sensor layer.

According to various embodiments of the disclosure, the processor may be configured to deactivate the wireless charging coil in response to reception of input performed on a control key that deactivates the wireless charging function, in the state in which the wireless charging function is activated.

According to various embodiments of the disclosure, the processor may be configured to activate the first sensor layer and the second sensor layer in response to the reception of input performed on the control key for deactivating the wireless charging function.

Figure 7:
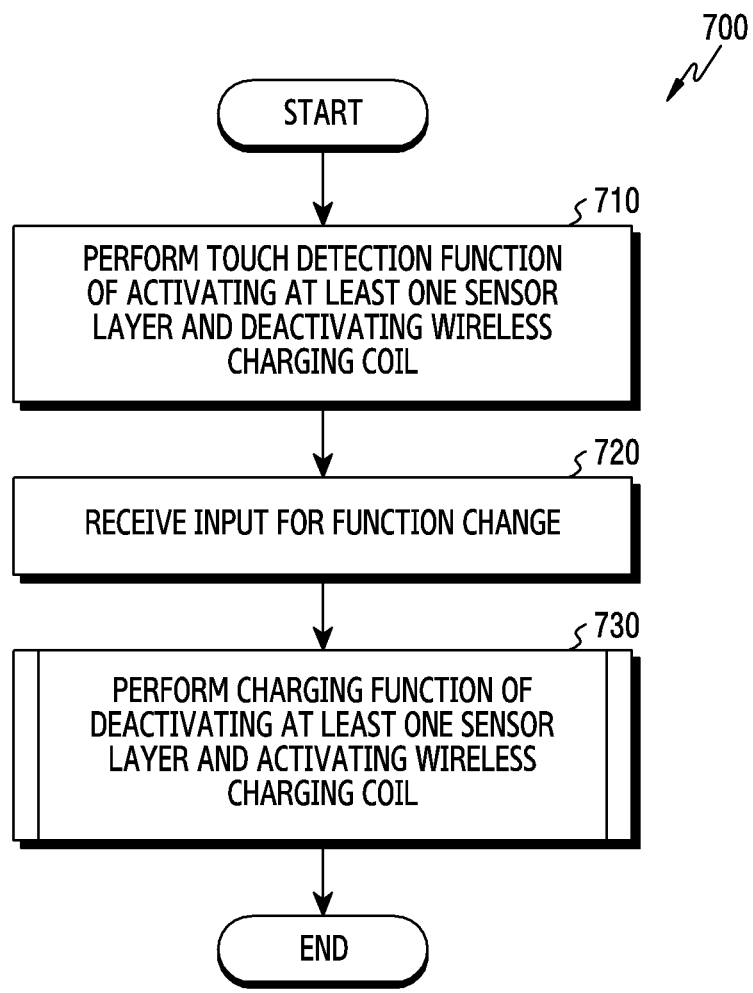
FIG. 7 is a flowchart illustrating a method of providing a wireless charging function by an electronic device according to an embodiment of the disclosure.

FIG. 7 is a flowchart 700 illustrating a method of providing a wireless charging function by an electronic device according to an embodiment of the disclosure. In the embodiment provided hereinafter, operations may be performed sequentially, but without necessarily being limited thereto. For example, the order of operations may be changed, or at least two operations may be performed in parallel.

Referring to FIG. 7, according to various embodiments of the disclosure, the electronic device 101 (e.g., the processor 120 of FIG. 1) may perform a touch detection function at operation 710. According to an embodiment of the disclosure, the touch detection function may be a mode that activates the touchpad 214 and deactivates the wireless charging device 320 (e.g., the wireless charging coil 322).

According to various embodiments of the disclosure, the electronic device 101 (e.g., the processor 120 of FIG. 1) may receive input for a function change at operation 720. The input for a function change may be input performed on at least one of the plurality of keys 212 disposed in the electronic device 101. For example, the electronic device 101 may include at least one control key for controlling a wireless charging function, and the processor 120 may receive user input performed on a control key indicating activation of wireless charging.

According to various embodiments of the disclosure, the electronic device 101 (e.g., the processor 120 of FIG. 1) may suspend the touch detection function and may perform a charging function at operation 730. According to an embodiment of the disclosure, the processor 120 may activate the wireless charging device 320 and perform a charging function. According to another embodiment of the disclosure, the processor 120 may deactivate the touchpad 214 while the charging function is being performed so as to prevent unnecessary power consumption.

Figure 8:
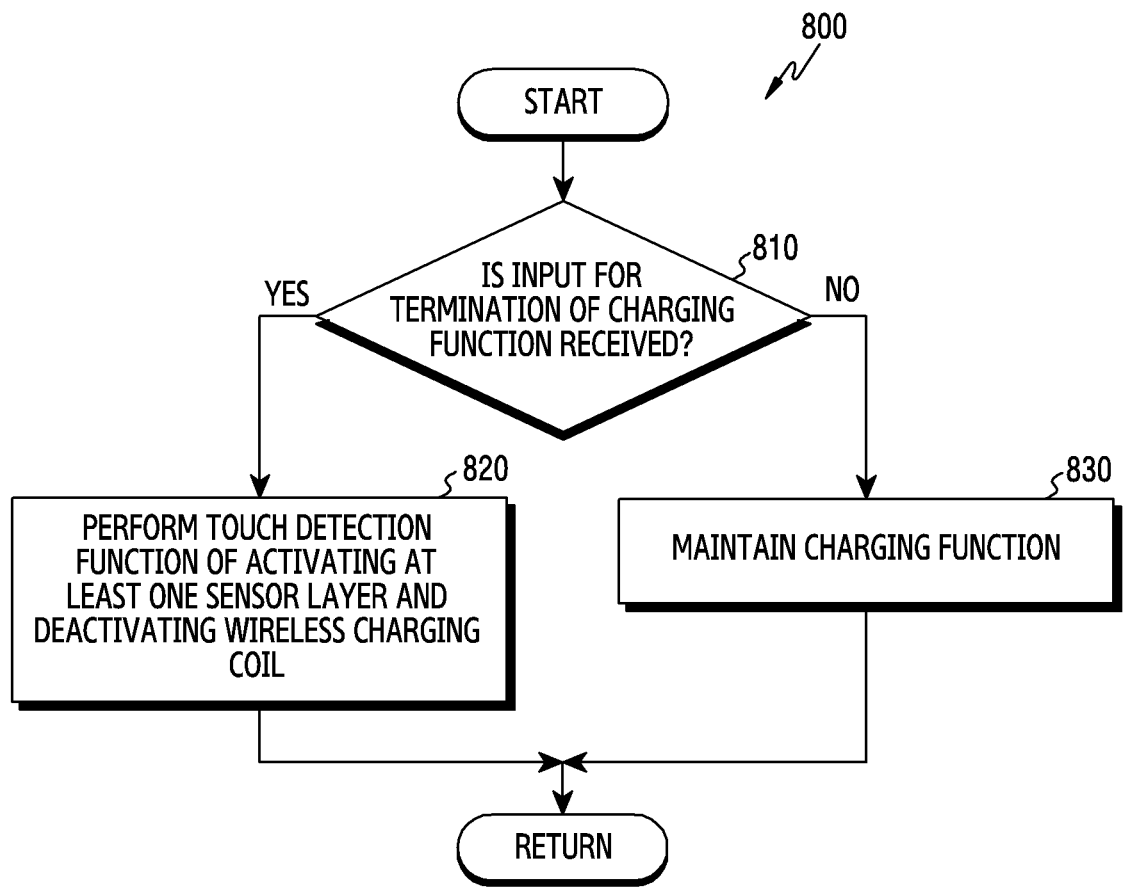
FIG. 8 is a flowchart illustrating a method of performing a charging function by an electronic device according to an embodiment of the disclosure.

FIG. 8 is a flowchart 800 illustrating a method of providing a charging function by an electronic device according to an embodiment of the disclosure. According to various embodiments of the disclosure, the operations of FIG. 8 may be various embodiments of operation 730 of FIG. 7. In the embodiment provided hereinafter, operations may be performed sequentially, but are not necessarily limited thereto. For example, the order of operations may be changed, or at least two operations may be performed in parallel.

Referring to FIG. 8, according to various embodiments of the disclosure, the electronic device 101 (e.g., the processor 120 of FIG. 1) may determine whether input for termination of a charging function is received while the charging function is being performed at operation 810. The input for termination of the charging function may be input performed on at least one of the plurality of keys 212 disposed in the electronic device 101. For example, the processor 120 may determine whether user input performed on a control key indicating deactivation of wireless charging is received.

According to various embodiments of the disclosure, if input for termination of the charging function is not received, the electronic device 101 (e.g., the processor 120 of FIG. 1) may maintain the charging function at operation 830. According to an embodiment of the disclosure, the processor 120 may maintain activation of the wireless charging device 320.

According to various embodiments of the disclosure, if input for termination of the charging function is received, the electronic device 101 (e.g., the processor 120 of FIG. 1) may terminate the charging function and perform a touch detection function at operation 820. According to an embodiment of the disclosure, the processor 120 may perform processing so that the wireless charging device 320 is deactivated.

An operation method of an electronic device, which includes a touchpad including an electrode pattern and a plurality of openings formed in the electrode pattern, and a wireless charging coil, may include performing a touch detection function of detecting contact with an input object using at least one electrode pattern of the touchpad, and performing a charging function of transmitting power via the plurality of openings in a wireless manner using the wireless charging coil in response to reception of input performed on a designated first control key.

According to various embodiments of the disclosure, the operation of performing the touch detection function may include the operation of activating the touchpad and deactivating the wireless charging coil.

According to various embodiments of the disclosure, the operation of performing the charging function may include activating the wireless charging coil and deactivating the touchpad.

According to various embodiments of the disclosure, the method may include operations of terminating the charging function in response to input performed on a designated second control key while performing the charging function and of performing the touch detection function.

An electronic device according to various embodiments may improve the performance of a wireless charging function using a touchpad including a sensor layer, which includes an electrode pattern and a plurality of openings formed in at least a part of the electrode pattern, and a ground layer, which is aligned with the electrode pattern and has at least one opening formed therein, and a wireless power transmission coil, which is disposed below the touchpad and is configured to transmit charging power via the plurality of openings in a wireless manner.

The effects capable of being obtained based on the disclosure are not limited to the above-described effects, and those skilled in the art will clearly understand other effects which are not mentioned above based on the descriptions set forth below.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments of the disclosure, each component (e.g., a module or a program) of the above-described components may include a single entity or multiple entities. According to certain embodiments of the disclosure, one or more of the above-described components may be omitted, or one or more other components may be added. Alternatively or additionally, a plurality of components (e.g., modules or programs) may be integrated into a single component. In such a case, according to certain embodiments of the disclosure, the integrated component may still perform one or more functions of each of the plurality of components in the same or similar manner as they are performed by a corresponding one of the plurality of components before the integration. According to certain embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device that supports a wireless charging function, the electronic device comprising:
   a housing;
   a first sensor layer, disposed inside the housing and comprising a plurality of first electrode lines in a first direction and a plurality of first openings formed within the first electrode line;
   a second sensor layer, disposed below the first sensor layer and comprising a plurality of second electrode lines in a second direction orthogonal with the first direction and a plurality of second openings formed within the second electrode line;
   a wireless charging coil, disposed below the second sensor layer and configured to transmit power in a wireless manner; and
   a ground layer, the ground layer comprising a first ground pattern aligned with the plurality of first electrode lines, a second ground pattern aligned with the plurality of second electrode lines, and at least one third opening,
   wherein the plurality of first openings, the plurality of second openings, and the at least one third opening are aligned, so that the power is transmitted via the plurality of first openings, the plurality of second openings, and the at least one third opening in the wireless manner.

2. The electronic device of claim 1, wherein the ground layer is disposed below the second sensor layer.

3. The electronic device of claim 2, wherein the ground layer is disposed between the second sensor layer and the wireless charging coil.

4. The electronic device of claim 1, wherein the at least one third opening corresponds to at least one of locations of the plurality of first openings or locations of the plurality of second openings.

5. The electronic device of claim 1, wherein the at least one third opening corresponds to at least one of shapes of the plurality of first openings or shapes of the plurality of second openings.

6. The electronic device of claim 1, wherein the at least one third opening corresponds to at least one of a number of the plurality of first openings and a number of the plurality of second openings.

7. The electronic device of claim 1, wherein the first sensor layer and the second sensor layer are configured to detect contact with an input object.

8. The electronic device of claim 1, further comprising:
   at least one control key configured to control the wireless charging function; and
   a processor configured to activate the wireless charging coil in response to reception of input performed on a first control key that activates the wireless charging function.

9. The electronic device of claim 8, wherein, when the wireless charging coil is activated, the processor is further configured to deactivate the first sensor layer and the second sensor layer.

10. The electronic device of claim 8, wherein the processor is further configured to deactivate the wireless charging coil in response to reception of input performed on a second control key that deactivates the wireless charging function in a state in which the wireless charging function is activated.

11. The electronic device of claim 10, wherein the processor is further configured to activate the first sensor layer and the second sensor layer in response to the reception of the input performed on the second control key that deactivates the wireless charging function.

12. A method of an electronic device that comprises a touchpad, including a plurality of first electrode lines in a first direction and a plurality of first openings formed within the first electrode line, a plurality of second electrode lines in a second direction orthogonal with the first direction and a plurality of second openings formed within the second electrode line, and a wireless charging coil, the method comprising:
- performing a touch detection function of detecting contact with an input object using at least one of the first electrode lines and the second electrode lines of the touchpad; and
- performing a charging function of transmitting power in a wireless manner using the wireless charging coil, in response to reception of input performed on a designated first control key,
- wherein the power is transmitted through a ground layer, the ground layer including a first ground pattern aligned with the plurality of first electrode lines, a second ground pattern aligned with the plurality of second electrode lines, and at least one third opening,
- wherein the plurality of first openings, the plurality of second openings, and the at least one third opening are aligned, so that the power is transmitted through the plurality of first openings, the plurality of second openings, and the at least one third opening in the wireless manner.

13. The method of claim 12, wherein the performing of the touch detection function comprises:
- activating the touchpad and deactivating the wireless charging coil.

14. The method of claim 12, wherein the performing of the charging function comprises:
- activating the wireless charging coil and deactivating the touchpad.

15. The method of claim 12, further comprising:
- terminating the charging function in response to input performed on a designated second control key while performing the charging function, and performing the touch detection function.

\* \* \* \* \*